United States Patent
Shim et al.

(10) Patent No.: US 9,710,933 B2
(45) Date of Patent: Jul. 18, 2017

(54) METHOD AND APPARATUS FOR PROCESSING TEXTURE

(71) Applicant: Samsung Electronics Co., Ltd., Suwon-si (KR)

(72) Inventors: Hee Jun Shim, Seoul (KR); Soo Jung Ryu, Hwaseong-si (KR); Sang Heon Lee, Hwaseong-si (KR); Sun Min Kwon, Seoul (KR); Ho Young Kim, Seoul (KR); Seong Hoon Jeong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 14/815,077

(22) Filed: Jul. 31, 2015

(65) Prior Publication Data

US 2016/0110889 A1 Apr. 21, 2016

(30) Foreign Application Priority Data

Oct. 21, 2014 (KR) ........................ 10-2014-0142771

(51) Int. Cl.
*G06T 11/00* (2006.01)

(52) U.S. Cl.
CPC ................................. *G06T 11/001* (2013.01)

(58) Field of Classification Search
CPC ......... G06T 11/001; G06T 7/40; G06T 15/04; G09G 2360/121
See application file for complete search history.

(56) References Cited

U.S. PATENT DOCUMENTS 6,766,053 B2 7/2004 Fan et al.
2013/0343648 A1 12/2013 Sato

FOREIGN PATENT DOCUMENTS

JP 5520122 B2 4/2014
KR 10-0427523 B1 4/2004
KR 10-0789654 B1 12/2007

*Primary Examiner* — Antonio A Caschera (57) ABSTRACT

Provided is a method of processing a texture. The method includes acquiring texture position information in a texture image corresponding to pixel position information of pixels constituting a frame, acquiring texture classification information (TCI) representing a similarity between respective texture factors of two or more classified regions in the texture image based on the texture position information, determining an amount of texture data requested from a memory according to the TCI, and reading texture data corresponding to the determined amount of texture data based on the texture position information.

21 Claims, 9 Drawing Sheets

|  |  |  |  |  |  |  |  |  |  |
|---|---|---|---|---|---|---|---|---|---|
| -8 | -8 | -8 | -8 | -8 | -8 | -8 | -8 | -8 | 7 |
| -8 | 7 | 5 | 7 | -8 | -8 | -8 | -8 | -8 | -8 |
| -8 | -8 | -8 | -8 | 5 | -8 | -8 | -8 | -8 | -8 |
| -8 | -8 | -8 | -8 | 7 | 7 | -8 | -8 | -8 | -8 |
| -8 | -8 | -8 | -8 | -8 | -8 | -8 | -8 | -8 | -8 |
| -8 | -8 | -8 | 7 | -8 | -8 | -8 | 7 | 5 | 7 |
| 7 | -8 | 7 | -8 | -8 | 7 | -8 | -8 | -8 | -8 |
| -8 | 7 | -8 | -8 | -8 | 5 | 7 | 7 | 7 | 7 |

METHOD AND APPARATUS FOR PROCESSING TEXTURE

CROSS-REFERENCE TO RELATED APPLICATION

This application claims the benefit under 35 USC 119(a) of Korean Patent Application No. 10-2014-0142771, filed on Oct. 21, 2014, in the Korean Intellectual Property Office, the entire disclosure of which is incorporated herein by reference for all purposes.

BACKGROUND

1. Field

This application relates to methods and apparatuses for processing textures mapped to pixels constituting a frame.

2. Description of Related Art

Examples of the three-dimensional (3D) graphics application program interface (API) standards include OpenGL, OpenGL ES, and Direct 3. The API standards include a method of rendering each frame of 3D graphics and displaying an image. When each frame of 3D graphics is rendered, many operations are performed and much power is consumed.

Thus, it is necessary to reduce an amount of operations and the number of times of accessing an external memory of a graphic processing apparatus when performing rendering.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, methods and apparatuses for reducing the number of texture data used to process a texture, based on texture position information and texture classification information (TCI) in a texture image are provided.

Provided is a non-transitory computer-readable recording medium that stores a program that performs a texture processing method when executed by a computer.

Additional aspects will be set forth in part in the description which follows and, in part, will be apparent from the description, or may be learned by practice of the presented exemplary embodiments.

According to an aspect of an exemplary embodiment, a method for processing a texture includes: acquiring texture position information in a texture image corresponding to pixel position information of pixels constituting a frame; acquiring TCI representing a similarity between respective texture factors of two or more classified regions in the texture image based on the texture position information; determining an amount of texture data requested from a memory according to the TCI; and reading texture data corresponding to the determined amount of texture data based on the texture position information.

The determining of the amount of texture data may include determining a minimum amount of texture data by using the TCI and a predetermined threshold value at which texture factor values in the texture image are determined to be similar.

The reading of the texture data may include: requesting texture data stored in the memory based on the texture position information; and reading texture data corresponding to the determined minimum amount of texture data according to the request.

The method may further include performing texture filtering by using the read texture data.

The performing of the texture filtering may include performing the texture filtering by generating as much read texture data as the texture data necessary to perform the texture filtering.

The method may further include determining a texture filtering mode based on the TCI, wherein the performing of the texture filtering may include performing the texture filtering by using the read texture data and the determined texture filtering mode.

The texture factor may include at least one of brightness, transparency, and filter information of a texture represented by the texture position information.

The memory may include a texture cache, and the determining of the amount of texture data may include: requesting texture data stored in the texture cache based on the texture position information; receiving cache hit information and cache miss information about the requested texture data from the texture cache; and determining the amount of texture data based on the cache hit information, the cache miss information, and the TCI.

The determining of the amount of texture data may include determining the amount of texture data based on a first direction and a texel indicated by the texture position information when a pattern of the texture data indicates a presence of a texture data change in the first direction.

According to an aspect of another exemplary embodiment, an apparatus for processing a texture includes: a memory configured to store texture data of a texture mapped to pixels constituting a frame; and a controller configured to acquire texture position information in a texture image corresponding to pixel position information of the pixel, acquire TCI representing a similarity between respective texture factors of two or more classified regions in the texture image based on the texture position information, determine an amount of texture data requested from the memory according to the TCI, and read texture data corresponding to the determined amount of texture data from the memory based on the texture position information.

The controller may determine the minimum amount of texture data by using the TCI and a predetermined threshold value at which texture factor values in the texture image are determined to be similar.

The controller may request the texture data from the memory based on the texture position information, and reads texture data corresponding to the determined minimum amount of texture data according to the request.

The apparatus may further include a texture filter configured to perform texture filtering by using the read texture data.

The texture filter may perform the texture filtering by generating as much read texture data as the texture data necessary to perform the texture filtering.

The controller may determine a texture filtering mode based on the TCI, and the texture filter may perform the texture filtering by using the read texture data and the determined texture filtering mode.

When a pattern of the texture data indicates a presence of a texture data change in a first direction, the controller may determine the amount of texture data based on the first direction and a texel indicated by the texture position information.

According to an aspect of another exemplary embodiment, a graphic processing apparatus includes: a shader-core configured to perform pixel shading to determine colors of pixels constituting a frame; and a texture processor configured to receive a transmission request for pixel values corresponding to the pixels from the shader-core, acquire texture position information in a texture image corresponding to pixel position information of the pixels, acquire TCI representing a similarity between respective texture factors of two or more classified regions in the texture image based on the texture position information, determine an amount of texture data requested from a memory according to the TCI, read texture data corresponding to the determined amount of texture data from the memory based on the texture position information, and generate the pixel values by using the read texture data.

The texture processor may determine the minimum amount of texture data by using the TCI and a predetermined threshold value at which texture factor values in the texture image are determined to be similar.

The texture position information may include at least one of texture coordinate information and an address of a graphic processing unit (GPU) memory used to request the texture data.

The apparatus may further include a pixel processor configured to determine the pixel values corresponding to a tile.

The apparatus may further include a tile buffer configured to store the pixel values corresponding to the tile received from the pixel processor.

According to an aspect of another exemplary embodiment, a non-transitory computer-readable recording medium stores a program that performs a texture processing method when executed by a computer, the texture processing method including: acquiring texture position information in a texture image corresponding to pixel position information of pixels constituting a frame; acquiring TCI representing a similarity between respective texture factors of two or more classified regions in the texture image based on the texture position information; determining an amount of texture data requested from a memory according to the TCI; and reading texture data corresponding to the determined amount of texture data based on the texture position information.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. However, the application is not limited to the embodiments. In the drawings, like reference numerals denotes like elements.

The terms used in the following descriptions are those general terms currently widely used in the art in consideration of functions in regard to the embodiments, but the terms may vary according to the intention of those of ordinary skill in the art, precedents, or new technology in the art.

Also, in some case, the applicant may voluntarily select some terms for better understanding and/or for convenience of description, and in this case, the detailed meanings thereof will be described in the relevant sections. Thus, the terms used in the following descriptions should be understood not as simple names but based on the meaning of the terms and the overall description of the embodiments.

Although terms such as "first" and "second" may be used herein to describe various elements or components, these elements or components should not be limited by these terms. These terms are only used to distinguish one element or component from another element or component. For example, a first element may be termed a second element, and, similarly, a second element may be termed a first element, without departing from the scope of the application. As used herein, the term "and/or" includes any and all combinations of one or more of the associated listed items.

The terms such as "comprise", "include", and "have" used in this specification may not be interpreted as necessarily including all of various elements or operations described in this specification, and may be interpreted as not including some of the various elements or operations, or as further including additional elements or operations. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

The terms used in this specification are used for describing embodiments and do not limit the scope of the application. As used herein, the singular forms "a", "an", and "the" are intended to include the plural forms as well, unless the context clearly indicates otherwise.

Hereinafter, embodiments will be described in detail with reference to the accompanying drawings. The embodiments relate to methods and apparatuses for processing textures, and detailed descriptions of matters well-known to those of ordinary skill in the art will be omitted for conciseness.

Figure 1:
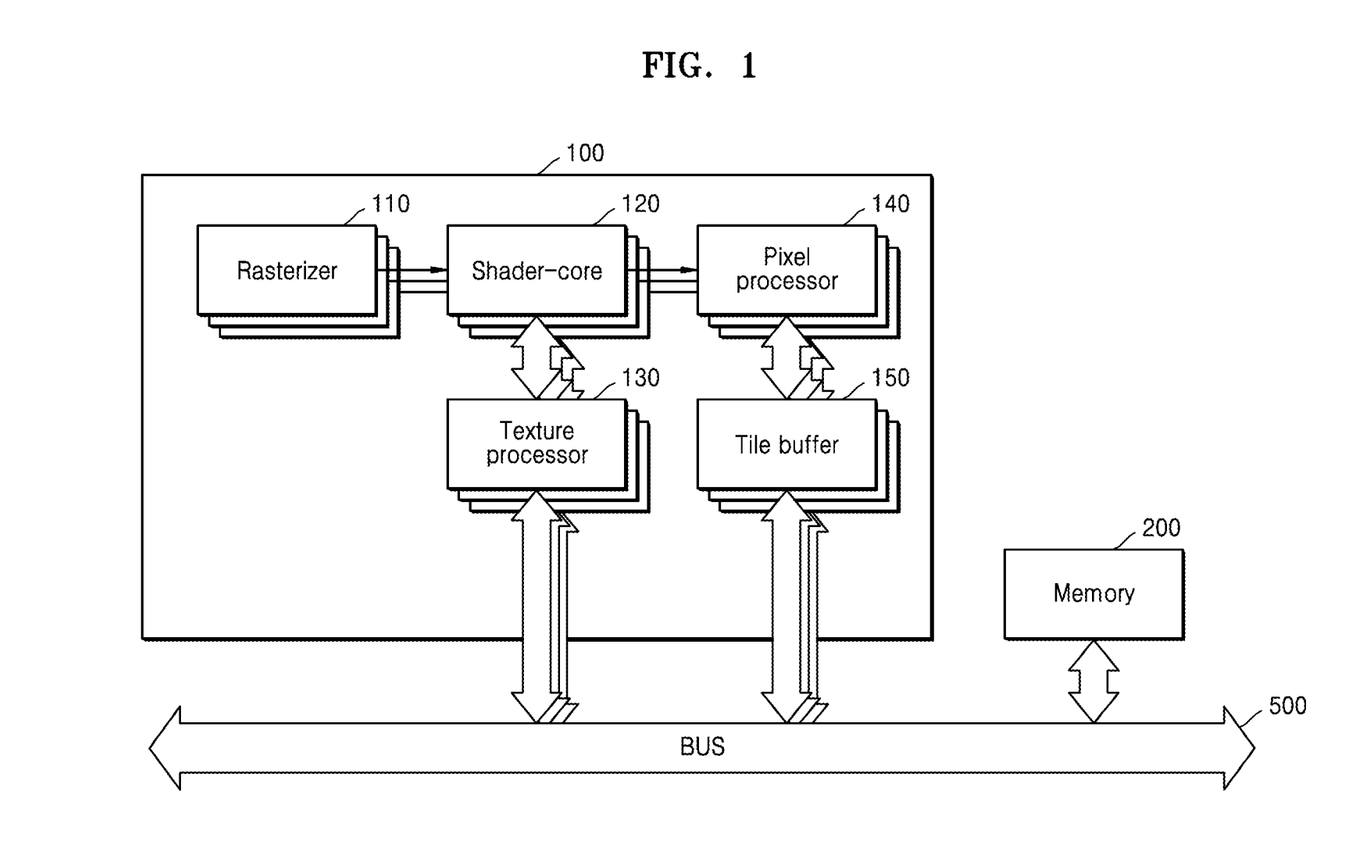
FIG. 1 is a diagram illustrating an example of a graphic processing apparatus.

FIG. 1 is a diagram illustrating an example of a graphic processing apparatus.

Those of ordinary skill in the art will understand that the graphic processing apparatus 100 may further include other general-purpose components in addition to the components illustrated in FIG. 1.

Referring to FIG. 1, the graphic processing apparatus 100 may include a rasterizer 110, a shader-core 120, a texture processor 130, a pixel processor 140, and a tile buffer 150. However, not all of the illustrated components are indispensable components. The graphic processing apparatus 100 may be implemented by more components or less components than the illustrated components. The above components will be described below one by one.

The graphic processing apparatus 100 may communicate data with an external memory 200 through a bus 500.

The graphic processing apparatus 100 is a three-dimensional (3D) graphics processing apparatus and may use a tile-based rendering (TBR) method as illustrated in FIG. 1. That is, in order to generate 3D graphics corresponding to one frame, the graphic processing apparatus 100 may process a plurality of divided tiles of a predetermined size through the rasterizer 110, the shader-core 120, and the pixel processor 140 and store the processing results in the tile buffer 150.

The graphic processing apparatus 100 may process all of the tiles in parallel by using a plurality of channels each constructed by the rasterizer 110, the shader-core 120, and the pixel processor 140. When a plurality of tiles corresponding to a frame are processed, the graphic processing apparatus 100 may transmit the processing results stored in the tile buffer 150 to a frame buffer (not illustrated) of the memory 200.

The shader-core 120 may include a pixel shader. The shader-core 120 may further include a vertex shader or may include a combination of a vertex shader and a pixel shader. When the shader-core 120 performs a function of the vertex shader, the shader-core 120 may generate a primitive representing an object and transmit the same to the rasterizer 110. Also, the shader-core 120 may receive a rasterized primitive from the rasterizer 110 to perform pixel shading.

The rasterizer 110 may rasterize a primitive generated from the vertex shader through a geometric transformation process.

The shader-core 120 may perform pixel shading to determine the colors of all pixels constituting a tile including fragments of the rasterized primitive. The shader-core 120 may use a pixel value generated by a texture in a pixel shading process in order to generate stereoscopic and realistic 3D graphics.

When the shader-core 120 requests the texture processor 130 to transmit a pixel value corresponding to a desired pixel, the texture processor 130 may transmit a pixel value generated by processing a prepared texture. In this case, the texture may be stored in the texture processor 130 or in the external memory 200 of the graphic processing apparatus 100. When the texture used to generate the pixel value requested by the shader-core 120 is not present in the texture processor 130, the texture processor 130 may fetch and use the texture from the memory 200.

The pixel processor 140 may determine all pixel values corresponding to a tile by determining a pixel value to be finally displayed, through a process such as a depth test, with respect to pixels corresponding to the same position in the tile.

The tile buffer 150 may store all pixel values corresponding to the tile received from the pixel processor 140. When the graphic processing process on all tiles constituting the file is completed, the processing results stored in the tile buffer 150 may be transmitted to the frame buffer of the memory 200.

Hereinafter, the 3D graphics processing process will be described with reference to FIG. 2.

Figure 2:
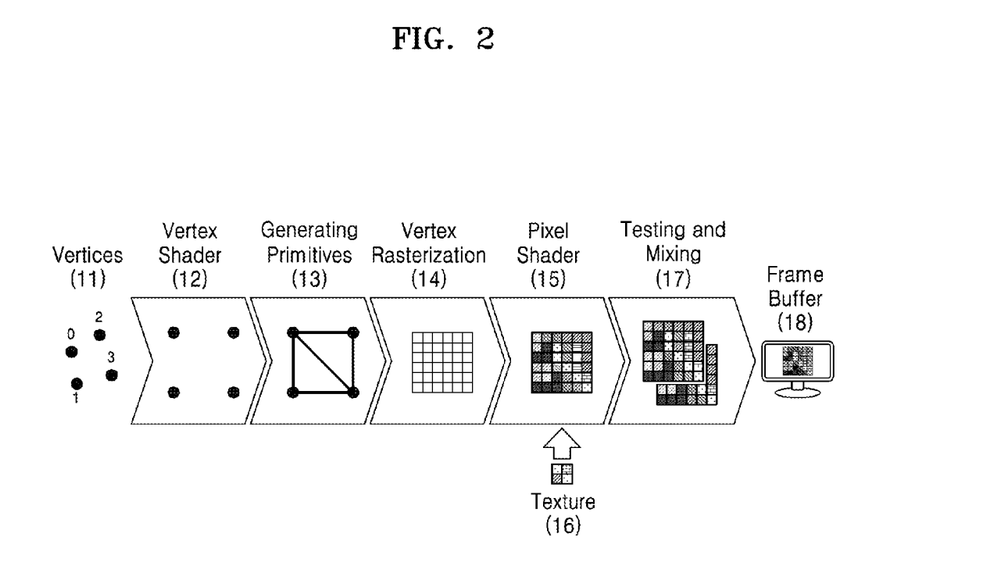
FIG. 2 is a diagram illustrating an example of a process of processing three-dimensional (3D) graphics by the graphic processing apparatus of FIG. 1.

FIG. 2 is a diagram illustrating an example of a process of processing 3D graphics by the graphic processing apparatus of FIG. 1.

Referring to FIG. 2, a 3D graphics processing process is performed through operations 11 to 17. The 3D graphics processing process may be broadly divided into three operations of geometric transformation, rasterization, and pixel shading, and more detailed operations thereof will be described below. However, it is noted that the 3D graphics processing process is not limited thereto and thus may include more or less operations.

Operation 11 is an operation of generating vertices. The vertices are generated to represent objects included in 3D graphics.

Operation 12 is an operation of shading the generated vertices. The vertex shader may shade the vertices by designating the positions of the vertices generated in operation 11.

Operation 13 is an operation of generating primitives. The primitives refer to points, lines, or polygons formed by using at least one vertex. As an example, the primitive may represent a triangle formed by connecting the vertices.

Operation 14 is an operation of rasterizing the primitive. Rasterizing the primitive refers to dividing the primitive into a plurality of fragments. The fragment may be a basic unit for performing graphic processing on the primitive. Since the primitive include only information about vertices, graphic processing on 3D graphics may be performed by generating fragments between the vertices in the rasterization operation.

Operation 15 is an operation of shading pixels. The fragments constituting the rasterized primitive may be the pixels constituting the tile. In the relevant art, the terms "fragment" and "pixel" are used in a mixed manner in some cases. For example, the pixel shader may be referred to as a fragment shader. In general, a basic unit of graphic processing constituting a primitive may be referred to as a fragment, and a basic unit of graphic processing from pixel shading may be referred to as a pixel. The color of a pixel may be determined in pixel shading.

Operation 16 is a texturing operation for determining the color of a pixel. Texturing is a process of determining the color of a pixel by using a prepared image, that is, a texture. When the color of each pixel is determined in order to represent various colors and patterns in the real world, the amount of data necessary for graphic processing and the graphic processing time are considerably increased. Therefore, a prepared texture is used to determine the color of a pixel. For example, the color of a pixel may be determined by storing the surface color of an object as a separate two-dimensional (2D) image that is a texture, and scaling up or down the stored texture according to the size and position of the object on a screen or mixing texel values by using textures having various resolution values.

Operation 17 is a testing and mixing operation. All pixel values corresponding to a tile may be determined by determining a pixel value to be finally displayed, through a process such as a depth test, with respect to pixels corresponding to the same position in the tile. 3D graphics corresponding to a frame may be generated by mixing a plurality of tiles generated through the above process.

Operation 18 is an operation of storing the frame generated through operations 11 to 17 in the frame buffer and displaying the frame stored in the frame buffer through a display.

For texture mapping, in the graphic processing apparatus, the texture processor reads texture data from a memory or a cache, performs filtering, and transmits the texture data to the pixel processor.

When a large amount of texture data access is required in a sampling and filtering process for texture data requested by the graphic processing apparatus, texturing is performed after all texture data are accessed from the memory or the cache. However, even in the case where there is no significant difference even when the same texture data values are extracted since all or some of the texture data are similar, when texturing is performed after all texture data is accessed from the memory or the cache, rapid graphic processing may be difficult to perform.

Hereinafter, a description will be given of texture processing methods and apparatuses for performing rapid graphic processing by reducing the frequency of accessing texture data by the texture processor according to the features of a texture.

Figure 3:
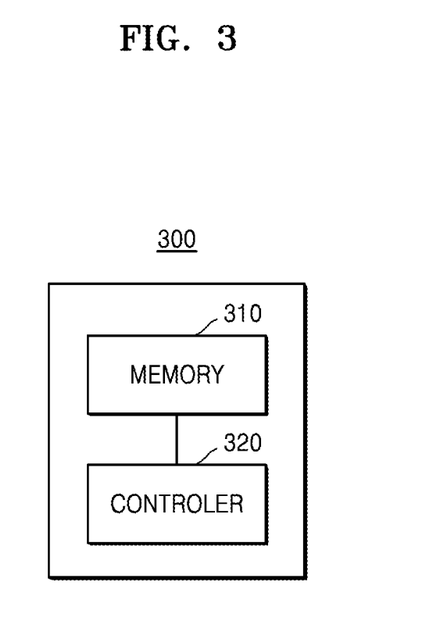
FIG. 3 is a block diagram illustrating an example of a texture processor illustrated in FIG. 1.

FIG. 3 is a block diagram of an example of a texture processing apparatus illustrated in FIG. 1.

Referring to FIG. 3, the texture processing apparatus 300 may include a memory 310 and a controller 320. However, not all of the illustrated components are indispensable components. The texture processing apparatus 300 may be implemented by more components or less components than the illustrated components. The above components will be described below one by one.

The controller 320 may receive a pixel value request for a pixel to be processed by the shader-core by receiving texture position information in a texture image corresponding to pixel position information of the pixel to be processed by the shader-core from the shader core. In response to this request, in order to transmit a generated pixel value to the shader-core, the controller 320 may perform texture processing by using texture classification information (TCI).

The TCI is information representing a similarity of a texture factor for each of two or more classified regions in the texture image. Also, the texture factor may include at least one of brightness, transparency, and filter information of a texture represented by the texture position information, but is not limited thereto. The TCI may be applied by increasing the level of a region that may be defined according to the features of the texture image. The criterion for the similarity and concreteness of the TCI may affect a texture data access reduction.

The TCI may be prestored for each of a plurality of textures. Also, the TCI may be stored when the texture is transferred to the graphic processing apparatus or while the graphic processing apparatus is performing graphic processing.

The TCI of the texture corresponding to the pixel to be processed may be acquired in order to perform the texture processing by using the TCI. This is to determine the level of texture processing for generating the pixel value requested from the shader-core according to the TCI of the texture. The TCI represents the degree of a similarity of texture data values of the classified regions in the texture image. For example, when a texture data value change in the region indicated by the TCI is small, adjacent texels constituting the texture have a same texel value or very similar texel values. On the other hand, when the texture data value change in the region indicated by the TCI is large, the adjacent texels constituting the texture have different texel values.

Since the TCI is information indicating whether texture data values of the classified regions in the texture image are similar, the TCI information may be represented in detail. For example, when the similarity of the texture data value in the region indicated by the TCI is lowest, the TCI may be expressed as "S0", and when the similarity of the texture data value in the region indicated by the TCI is highest, the TCI may be expressed as "SN".

In order to generate the pixel value requested from the shader-core, the texture processing apparatus 300 may extract texture data of the texture from the memory 310. When the similarity of the texture data value in the region indicated by the TCI is high, since it is based on similarity, a pixel value very similar to the requested pixel value may be generated even without using all texture data values that should be used for texture filtering in order to generate the requested pixel value. Also, the texture processing apparatus 300 may generate the pixel value very similar to the requested pixel value by calculating the mean value of the texture data values after the texture data value passes through a texture filter. Thus, since the texture processor may generate the pixel value even without using all texture data values, the amount of texture data requested from the memory 310 may be reduced.

When the similarity of the texture data value in the region indicated by the TCI is low, the requested pixel value may be generated by acquiring all texture data values, which should be used for texture filtering, and performing texture filtering. In this case, when the texture filtering is not performed by using all texture data values that should be used for the texture filtering, a pixel value having an error from the requested pixel value may be generated. Thus, when the similarity of the texture data value in the region indicated by the TCI is low, a pixel value corresponding to the requested pixel value may be generated by acquiring all texture data values, which should be used for texture filtering, and then performing texture filtering.

The amount of texture data used for texture filtering may be determined according to the texture filtering mode.

In general, the amount of texture data used to obtain a pixel value is determined according to the texture filtering mode. However, in addition, in an embodiment, the amount of texture data used for texture filtering may be determined according to the TCI.

According to the TCI, the controller 320 may determine whether to calculate the pixel value requested from the shader-core approximately (qualitative calculation) or accurately (quantitative calculation). In detail, the controller 320 may determine the amount of texture data used for texture filtering according to the TCI. When the similarity of the texture data value in the region indicated by the TCI is high, the graphic processing time may be reduced by reducing the number of times of cache miss or the frequency of accessing the external memory of the graphic processing apparatus by minimizing the amount of texture data used for texture filtering.

The controller 320 may request the texture data from the memory 310 (e.g., a texture cache) based on the texture position information. Herein, the texture position information may include at least one of texture coordinate information and an address of a graphic processing unit (GPU) memory used to request the texture data. The controller 320 may receive cache hit information and cache miss information about the requested texture data from the memory 310.

The controller 320 may determine the amount of texture data based on the cache hit information, the cache miss information, and the TCI.

When a pattern of the texture data indicates the presence of a texture data change in a first direction, the controller 320 may determine the amount of texture data based on the first direction and a texel indicated by the texture position information. For example, the pattern of the texture data may include a first pattern having a significant texture data change only in a horizontal direction and a second pattern having a significant texture data change only in a vertical direction. In the case of the presence of a significant texture data change only in the horizontal direction, only two texture data adjacent in the horizontal direction may be requested instead of four texture data (e.g., a texel) in the vertical direction and the horizontal direction.

The texture position information may include a plurality of position information, and the texture processing apparatus 300 may generate the pixel value requested from the shader-core by filtering the texture data about each of the plurality of position information. In this case, when the similarity of the texture data value in the region indicated by the TCI is high, the texture processing apparatus 300 may use one of the texture data as the texture data about each of the plurality of position information.

The texture processing apparatus 300 may change the filtering mode based on the TCI and the filtering mode that is to be performed by the texture processing apparatus 300. In this case, the amount of texture data used for texture filtering may be reduced by changing the filtering mode. For example, when the filtering mode is bilinear, four adjacent texel values are required based on the texture position information. In this case, they are combined into one by a bilinear filtering mode for obtaining the mean value thereof. When the four adjacent texel values are sufficiently similar, the texture processing apparatus 300 may change the filtering parameter from the bilinear one to the nearest one. The texture processing apparatus 300 may reduce the amount of texture data to reduce the operation in the texture filter and the energy consumption in the texture filter.

The memory 310 may store texture data of a texture mapped to a pixel constituting a frame. The texture data is data about a texture used in the graphic processing process. Also, the memory 310 may store a mipmap of various resolution values for one texture. The mipmap correspond to prepared textures having different resolution values.

The texture processing apparatus 300 may further include a texture filter and a decompressor (not shown). The memory 310 may extract the texture data necessary to process the pixel value requested by the shader-core and transmit the extracted texture data to the texture filter.

The texture filter may generate a pixel value by filtering the texture data received from the memory 310. Filtering the texture data refers to calculating a color value corresponding to the pixel by mixing the texture data. For example, the color value corresponding to the pixel may be calculated by calculating the mean value of the texture data included in a partial region on a texture space including the texture position information converted from the pixel position information. The pixel value generated by the texture filter is a filtered texel value obtained through a predetermined operation, and may be transmitted to the shader-core in response to the pixel value request of the shader-core.

The decompressor may perform decompression when the texture processing apparatus 300 receives a compressed texture from the external memory of the graphic processing apparatus. The decompressed texture may be stored in the memory 310.

The texture processing apparatus 300 may include a central operation processor (not shown) to control the overall operations of the memory 310, the controller 320, the texture filter, and the decompressor. The central operation processor may be implemented by a plurality of logic gates, or may be implemented by a combination of a general-purpose microprocessor and the memory 310 storing a program that may be executed in the microprocessor. Also, those of ordinary skill in the art will understand that the central operation processor may also be implemented by other types of hardware.

Various applications or operations performed by the texture processing apparatus 300 will be described below. However, the features, which may be clearly understood and expected by those of ordinary skill in the art even without specifying any one of the memory 310, the controller 320, the texture filter, and the decompressor, may be understood by general implementation, and the scope of the application is not limited by the physical/logical structures or the terms of specific configurations.

Figure 4:
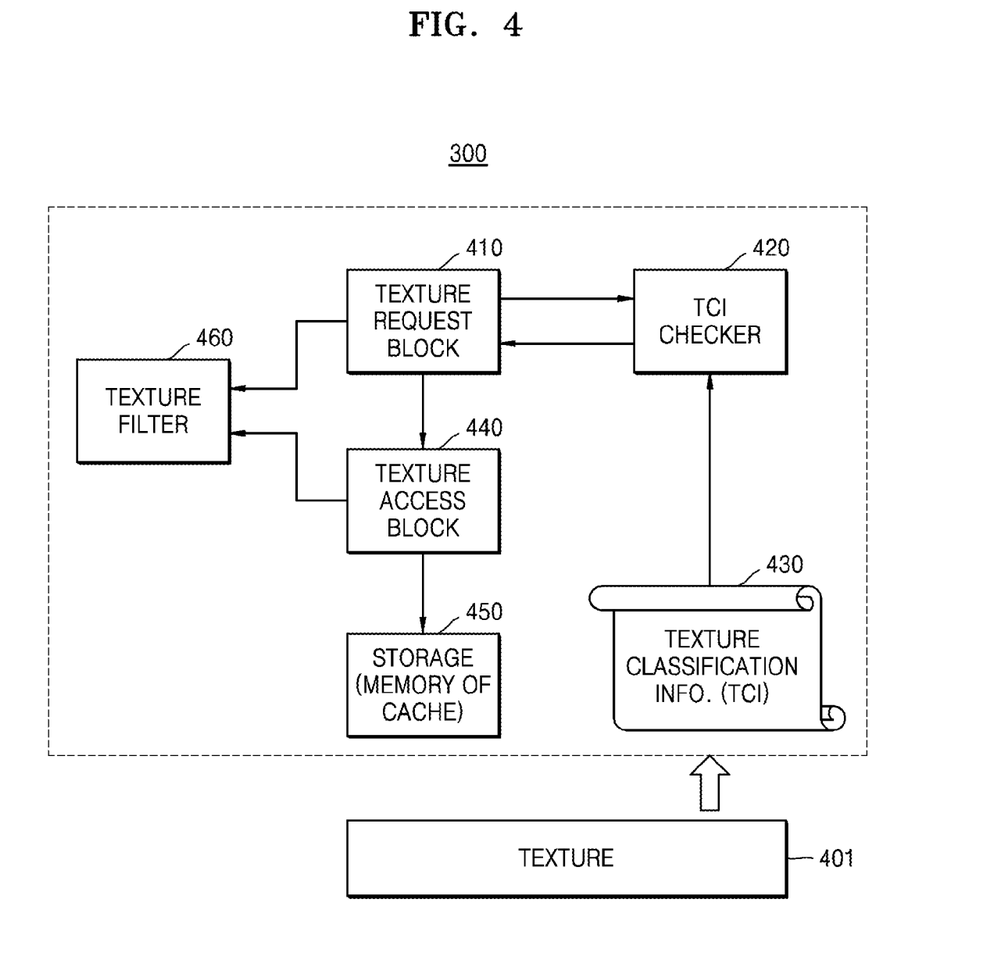
FIG. 4 is a detailed block diagram illustrating an example of the texture processor illustrated in FIG. 1.

FIG. 4 is a detailed block diagram illustrating an example of a texture processor illustrated in FIG. 1.

Referring to FIG. 4, the texture processing apparatus 300 may include a texture request block 410, a TCI checker 420, a TCI block 430, a texture data access block 440, a storage unit 450, and a texture filter 460. However, not all of the illustrated components are indispensable components. The texture processing apparatus 300 may be implemented by more components or less components than the illustrated components. The above components will be described below one by one.

The texture processing apparatus 300 may generate a pixel value by filtering at least one of texture data about a pixel. The amount of texture data used for texture filtering may be determined according to the texture filtering mode.

In a texture filtering process, the texture processing apparatus 300 utilizes four texel values in the case of using a bilinear filtering mode, utilizes eight texel values in two mipmaps (four texel values in each mipmap) in the case of using a trilinear filtering mode, and utilizes more texel values in the case of using an anisotropic filtering mode.

In this case, the texture processing apparatus 300 may reduce the necessary number (four, eight or more) of texture data (e.g., the number of texels) based on the TCI. For example, in the case of using the bilinear filtering mode, when the similarity of the texture data value in the region indicated by the TCI is determined to be high since a value change of the texture image in the region indicated by the texture position information is small, the texture processing apparatus 300 may generate the pixel value requested from the shader-core by filtering only one texel value instead of four texel values. In other words, the texture processing apparatus 300 may reduce a request for four texel values to a request for one texel value and use one texel value as each of the four texel values.

The texture request block 410 may acquire texture position information. The texture request block 410 transmits the texture position information to the TCI checker 420. The texture request block 410 may detect a position in an image (e.g., a texture, a layer, or a level (mipmap level)) based on the texture position information. When receiving information indicating that the data values in the image have a high similarity from the TCI checker 420, the texture request block 410 may reduce the amount of texture data used for texture filtering and request texture data from the storage unit 450.

The TCI checker 420 determines how many texture data is to be accessed from the storage unit 450. In other words, the TCI checker 420 may determine the amount of texture data used for texture filtering. Also, the TCI checker 420 may determine the degree of similarity of the texture data value in the region indicated by the TCI, based on the TCI.

The TCI block 430 may receive the TCI from the storage unit 450 storing the TCI. Alternatively, the TCI block 430 may receive the TCI from the texture 401. Herein, the storage unit 450 storing the TCI may be implemented in the texture processing apparatus 300 or may be implemented in an external memory. The TCI is information representing a similarity of a texture factor for each of two or more classified regions in the texture image. Also, the texture factor may include at least one of brightness, transparency, and filter information of a texture represented by the texture position information, but is not limited thereto.

The TCI checker 420 may transmit the determined similarity degree to the texture request block 410. The TCI checker 420 transmits the determined number of texture data to the texture data access block 440. The texture data access block 440 fetches the texture data corresponding to the determined number of texture data from the storage unit 450.

The texture request block 410 may transmit information necessary for texture filtering to the texture filter 460. The information necessary for texture filtering may be information about the texture factor. The texture data access block 440 may transmit the texture data fetched from the storage unit 450 to the texture filter 460. The texture filter 460 may generate a pixel value by filtering the texture data.

The texture processing apparatus 300 may perform texturing in units of two or more fragments. When there is texture position information about each fragment, the TCI block 430 may transmit a plurality of texture position information to the TCI checker 420. When each texture position information is included in the same region having a high similarity, the texture data access block 440 may acquire only one of the texture data (e.g., one texel) from the storage unit 450 and transmit the acquired texture data to the texture filter 460. The texture filter 460 may obtain a plurality of texture processing results by filtering the acquired texture data.

The controller 320 illustrated in FIG. 3 may be divided into the texture request block 410, the TCI checker 420, the TCI block 430, and the texture data access block 440 illustrated in FIG. 4, but is not limited thereto. That is, the controller 320 illustrated in FIG. 3 may be implemented by more or less components than the illustrated components.

Various applications or operations performed by the texture processing apparatus 300 will be described below. However, the features, which may be clearly understood and expected by those of ordinary skill in the art even without specifying any one of the texture request block 410, the TCI checker 420, the TCI block 430, and the texture data access block 440, may be understood by general implementation, and the scope of the application is not limited by the physical/logical structures or the terms of specific configurations.

Figure 5:
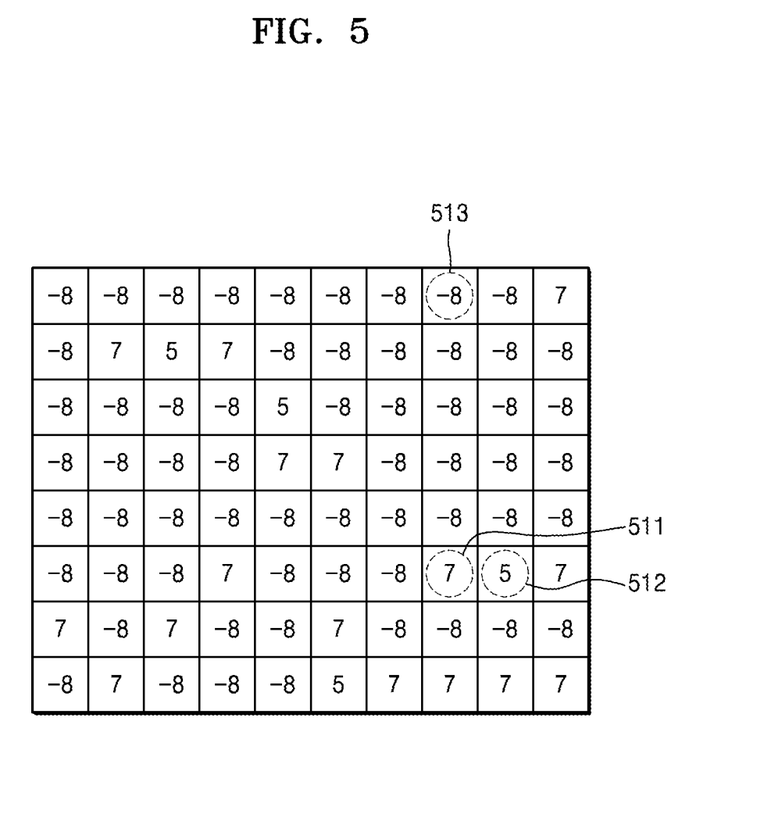
FIG. 5 is a diagram illustrating an example of a texture classification information (TCI)

FIG. 5 is a diagram illustrating an example of a texture classification information (TCI).

Referring to FIG. 5, a texture image is divided into a plurality of regions. A pixel position of a pixel constituting a frame may be mapped to a texture position in the texture image. The TCI is information representing a similarity of a texture factor for each of two or more classified regions in the texture image. Herein, the texture factor represents the brightness and transparency of the texture, but is not limited thereto. As illustrated in FIG. 5, each region may be represented by a numerical value of a similarity degree of the texture factor. When the similarity degree is high, the numerical value may be high. For example, a region 511 represents a similarity of about 70% in the texture brightness. A region 512 represents a similarity of about 50% in the texture brightness. A region 513 represents that filtering is not performed by using the TCI.

A greedy algorithm may be applied to the texture image, a similarity value may be allocated according to a difference value from an adjacent texel, and a similarity region may be gradually expanded. Also, those of ordinary skill in the art may understand that the allocation of the similarity value may be implemented by various algorithms and filters performing an analysis based on the pattern of a 2D image.

Figure 6:
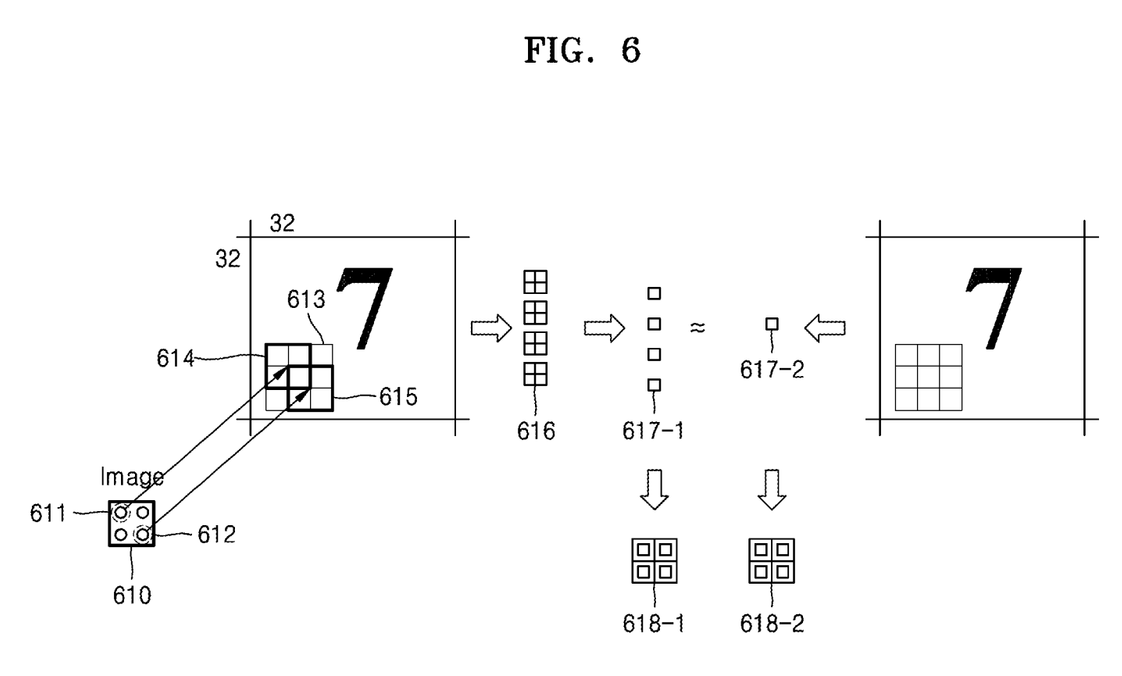
FIG. 6 is a diagram illustrating an example of a method of texturing a quad-level image by the texture processor.

FIG. 6 is a diagram illustrating an example of a method of texturing a quad-level image by the texture processor.

Referring to FIG. 6, the texture processing apparatus 300 requires four texel values for each pixel in the case of using the bilinear filtering mode. A quad-level image 610 is constituted by four pixels. As illustrated in FIG. 6, the texture processing apparatus 300 requires four pixels 614 in order to generate a value of the first pixel 611 of the quad-level image 610. Also, the texture processing apparatus 300 requires four pixels 615 in order to generate a value of the second pixel 612. With respect to nine adjacent texels 613, when result values 616 and 617-1 of the texture factor according to the bilinear filter mode and a result value 617-2 of the texture factor according to the nearest filter mode are sufficiently similar, pixel values 618-1 and 618-2 of an image may be generated by using the texture value of a pixel as the texture value of a quad pixel. That is, for generation of the pixel value, the texture processing apparatus 300 may fetch one texture value (not four texture values) from the memory. The texture processing apparatus 300 may reduce the graphic processing time by reducing the data access operation and the operation of the texture processing apparatus 300 by about 25%.

When the similarity of the texture data value in the region indicated by the TCI is high, even when performing texture filtering by using less texture data than the basic number of texture data used to calculate the pixel value requested from the shader-core, the texture processing apparatus 300 may generate the pixel value very similar to the requested pixel value and transmit the generated pixel value to the shader-core. When the similarity of the texture data value in the region indicated by the TCI is high, the controller 320 may determine the minimum number of texture data used for texture filtering and use only the texture data corresponding to the determined minimum number of texture data, thereby reducing the graphic processing time and the power consumption of the graphic processing apparatus.

On the other hand, when the similarity of the texture data value in the region indicated by the TCI is low, the texture processing apparatus 300 may perform texture filtering by using as many texture data as the number determined according to the texture filtering mode, in order to calculate the pixel value requested from the shader-core. When the similarity of the texture data value in the region indicated by the TCI is low, the controller 320 may determine the maximum number of texture data used for texture filtering. The controller 320 may increase the accuracy of the pixel value by using the texture data value corresponding to the determined maximum number of texture data. When the similarity of the texture data value in the region indicated by the TCI is low, the amount of texture data used for texture filtering may be equal to the amount of texture data determined according to the texture filtering mode.

Figure 7:
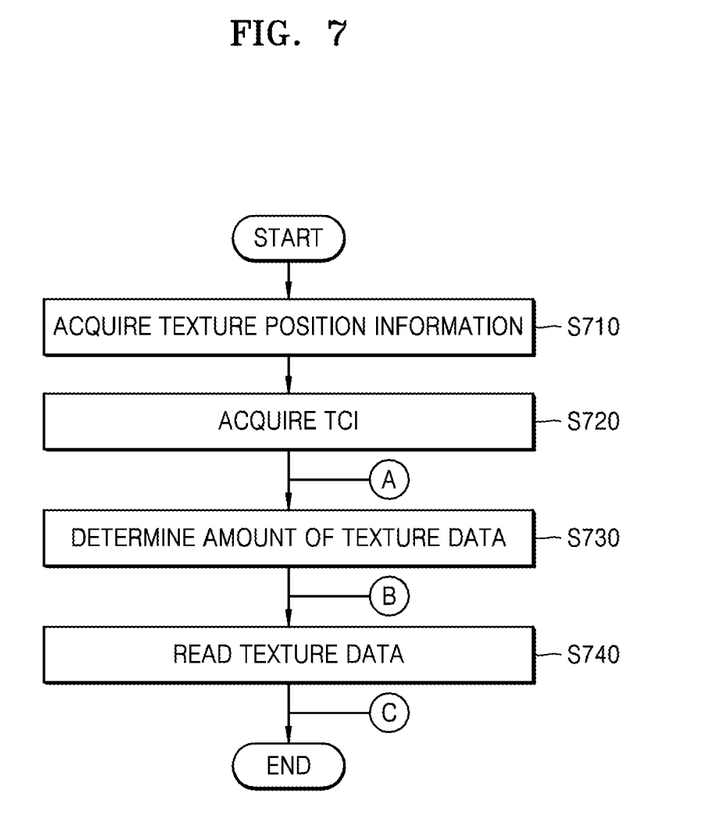
FIG. 7 is a flowchart of an example of a texture processing method.

FIG. 7 is a flowchart of an example of a texture processing method.

Referring to FIG. 7, in operation 5710, the texture processing apparatus 300 may acquire texture position information in a texture image. The texture position information in the texture image corresponds to pixel position information of a pixel constituting a frame.

In operation S720, the texture processing apparatus 300 may acquire TCI. The texture processing apparatus 300 may acquire the TCI based on the texture position information. Herein, the TCI represents a similarity of a texture factor for each of two or more classified regions in the texture image. The texture factor may include at least one of brightness, transparency, and filter information of a texture represented by the texture position information.

In operation S730, the texture processing apparatus 300 may determine the amount of texture data used for texture filtering based on the acquired TCI. The texture filtering refers to calculating a color value corresponding to the pixel by mixing the texture data. A method of determining the amount of texture data will be described later in detail with reference to FIG. 8.

In operation S740, the texture processing apparatus 300 may read texture data corresponding to the determined number of texture data based on the texture position information.

Figure 8:
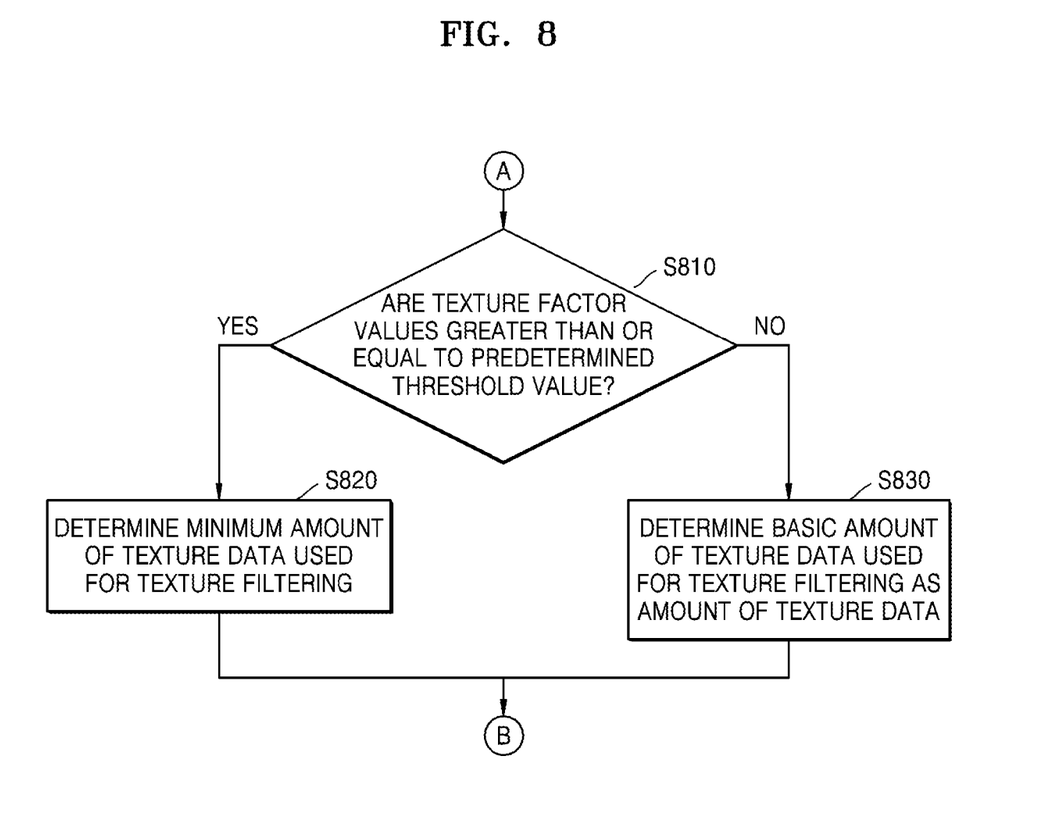
FIG. 8 is a flowchart of an example of an operation of determining a number of texture data requested from a memory in a texture processing method.

FIG. 8 is a flowchart of an example of an operation of determining the amount of texture data requested from a memory in a texture processing method.

Referring to FIG. 8, in operation S810, the texture processing apparatus 300 may determine a predetermined threshold value at which texture factor values in the texture image are determined to be similar. In general, the texture processing apparatus 300 requires N texture data (e.g., texel values) in order to generate a pixel value of one pixel. However, when a change in N texture data values is small, the pixel value may be generated by using only less than N texture data.

In operation S820, when the texture factor values are greater than or equal to the predetermined threshold value, the texture processing apparatus 300 may determine the minimum number of texture data used for texture filtering. The texture processing apparatus 300 may determine the minimum number of texture data used for texture filtering by using the predetermined threshold value and the TCI. In detail, when the texture factor values are greater than or equal to the predetermined threshold value, the similarity of the texture data value in the region indicated by the TCI may be determined to be high since a value change of the texture image is small. The texture processing apparatus 300 may perform texture filtering by using the minimum number of texture data smaller than the basic number of texture data used to calculate the pixel value. Also, the minimum number of texture data used for texture filtering may be determined differently according to the texture filtering modes, or may be determined as a predetermined value.

In operation S830, when the texture factor values are lesser than the predetermined threshold value, the texture processing apparatus 300 may determine the basic number of texture data used for texture filtering as the amount of texture data. Herein, the basic number of texture data may be determined according to the texture filtering mode.

Figure 9:
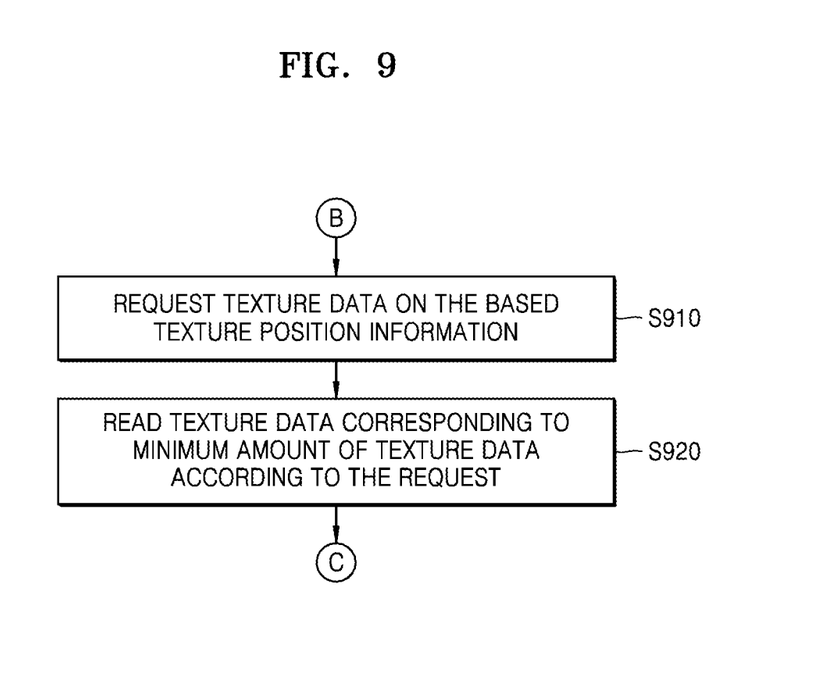
FIG. 9 is a flowchart of an example of an operation of reading a texture in a texture processing method.

FIG. 9 is a flowchart of an example of an operation of reading a texture in a texture processing method.

Referring to FIG. 9, in operation S910, the texture processing apparatus 300 may request the texture data stored in the memory based on the texture position information.

In operation S920, the texture processing apparatus 300 may read texture data corresponding to the minimum number of texture data according to the request.

Figure 10:
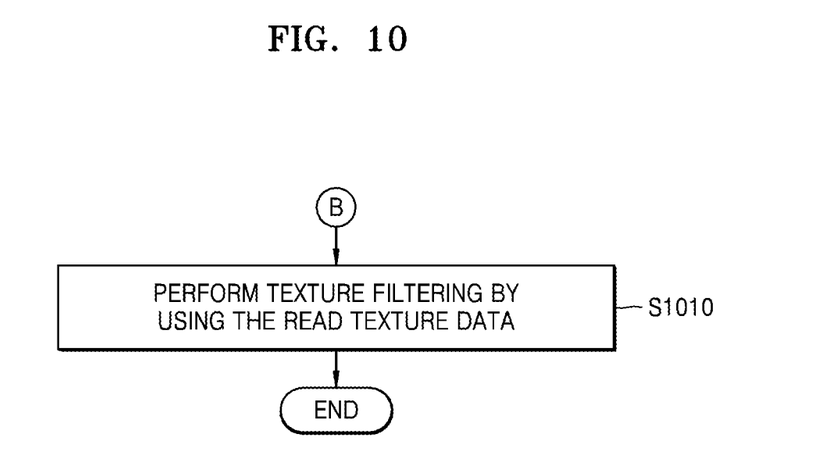
FIG. 10 is a flowchart of an example of an operation of performing texture filtering in a texture processing method.

FIG. 10 is a flowchart of an example of an operation of performing texture filtering in a texture processing method.

Referring to FIG. 10, in operation S1010, the texture processing apparatus 300 may perform texture filtering by using the read texture data. The texture processing apparatus 300 may perform texture filtering by generating the read texture data as many as the amount of texture data necessary to perform texture filtering.

In the case of the trilinear filtering mode, the texture processing apparatus 300 may perform texture filtering by using eight texel values in order to calculate one pixel value. However, when the similarity of the texture data value in the region indicated by the TCI is high, the texture processing apparatus 300 may perform texture filtering by using less than eight texels.

According to an embodiment, the texture processing apparatus 300 may determine the texture filtering mode based on the TCI. The texture processing apparatus 300 may perform texture filtering by using the read texture data and the determined texture filtering mode.

The above-described apparatuses may be implemented by hardware components, software components, and/or any combination thereof. For example, the apparatuses and components described in the embodiments may be implemented by using processors, arithmetic logic units (ALUs), digital signal processors, microcomputers, field programmable arrays (FPAs), programmable logic units (PLUs), microprocessors, one or more general-purpose computers or special-purpose computers, or any other devices that may execute and respond to instructions.

The processing apparatus may execute an operating system (OS) and one or more software applications executed in the OS. Also, the processing apparatus may access, store, operate, process, and generate data in response to the execution of software.

For convenience of understanding, it may be described that one processing apparatus is used. However, those or ordinary skill in the art will understand that the processing apparatus may include a plurality of processing elements and/or various types of processing elements. For example, the processing apparatus may include a plurality of processors or a processor and a controller. Also, the processing apparatus may include any other processing configurations such as parallel processors.

The software may include computer programs, codes, instructions, or any combination thereof, and may construct the processing apparatus for desired operations or may independently or collectively command the processing apparatus.

In order to be interpreted by the processing apparatus or to provide commands or data to the processing apparatus, the software and/or data may be permanently or temporarily embodied in any types of machines, components, physical devices, virtual equipments, computer storage mediums, or transmitted signal waves. The software may be distributed over network coupled computer systems so that it may be stored and executed in a distributed fashion. The software and data may be stored in one or more computer-readable recording mediums.

The methods according to the embodiments may be embodied in the form of program commands executable through various computer processes, which may be recorded on a non-transistory computer-readable recording medium. The non-transitory computer-readable recording medium may include program commands, data files, and data structures either alone or in combination. The program commands recorded on the non-transitory computer-readable recording medium may be those that are especially designed and configured for the embodiments, or may be those that are known and available to computer programmers skilled in the art.

Examples of the non-transitory computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands.

Examples of the program commands include machine language codes that may be generated by a compiler, and high-level language codes that may be executed by a computer by using an interpreter.

The above hardware devices may be configured to operate as one or more software modules to perform the operations of the embodiments, and vice versa.

Although the embodiments have been described with reference to the accompanying drawings, those of ordinary skill in the art will understand that various changes and modifications may be made therein. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, the scope of the application should be defined not by the described embodiments alone, but by the appended claims and the equivalents thereof.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the application as defined by the following claims.

What is claimed is:

1. A method of processing a texture, the method comprising:
   acquiring texture position information in a texture image corresponding to pixel position information of pixels constituting a frame;
   acquiring texture classification information (TCI) representing a similarity between respective texture factors of two or more classified regions in the texture image based on the texture position information;
   determining an amount of texture data requested from a memory according to the TCI; and
   reading texture data corresponding to the determined amount of texture data based on the texture position information.

2. The method of claim 1, wherein the determining of the amount of texture data comprises determining a minimum amount of texture data by using the TCI and a predetermined threshold value at which texture factor values in the texture image are determined to be similar.

3. The method of claim 2, wherein the reading of the texture data comprises:
   requesting texture data stored in the memory based on the texture position information; and
   reading texture data corresponding to the determined minimum amount of texture data according to the request.

4. The method of claim 1, further comprising performing texture filtering by using the read texture data.

5. The method of claim 4, wherein the performing of the texture filtering comprises performing the texture filtering by generating as much read texture data as the texture data necessary to perform the texture filtering.

6. The method of claim 4, further comprising determining a texture filtering mode based on the TCI,
   wherein the performing of the texture filtering comprises performing the texture filtering by using the read texture data and the determined texture filtering mode.

7. The method of claim 1, wherein the texture factor comprises at least one of brightness, transparency, and filter information of a texture represented by the texture position information.

8. The method of claim 1, wherein
   the memory comprises a texture cache, and
   the determining of the amount of texture data comprises:
   requesting texture data stored in the texture cache based on the texture position information;
   receiving cache hit information and cache miss information about the requested texture data from the texture cache; and
   determining the amount of texture data based on the cache hit information, the cache miss information, and the TCI.

9. The method of claim 1, wherein the determining of the amount of texture data comprises determining the amount of texture data based on a first direction and a texel indicated by the texture position information when a pattern of the texture data indicates a presence of a texture data change in the first direction.

10. An apparatus for processing a texture, the apparatus comprising:
    a controller; and
    a computer-readable memory comprising programs that, when executed by the controller, perform operations comprising:
    acquiring texture position information in a texture image corresponding to pixel position information of the pixels constituting a frame;
    acquiring texture classification information (TCI) representing a similarity between respective texture factors of two or more classified regions in the texture image based on the texture position information;
    determining an amount of texture data requested from the memory according to the TCI; and
    reading texture data corresponding to the determined amount of texture data from the memory based on the texture position information.

11. The apparatus of claim 10, wherein the determining of the amount of texture data comprises determining a minimum amount of texture data by using the TCI and a predetermined threshold value at which texture factor values in the texture image are determined to be similar.

12. The apparatus of claim 11, wherein the reading of the texture data comprises:
   requesting the texture data from the memory based on the texture position information; and
   reading texture data corresponding to the determined minimum amount of texture data according to the request.

13. The apparatus of claim 11, wherein the determining of the amount of texture data comprises determining the amount of texture data based on the first direction and a texel indicated by the texture position information when a pattern of the texture data indicates a presence of a texture data change in a first direction.

14. The apparatus of claim 10, wherein the programs that perform the operation comprises performing texture filtering by using the read texture data.

15. The apparatus of claim 14, wherein the performing of the texture filtering comprises performing the texture filtering by generating as much read texture data as the texture data necessary to perform the texture filtering.

16. The apparatus of claim 15, wherein
   the programs that perform the operation comprises determining a texture filtering mode based on the TCI,
   wherein the performing of the texture filtering comprises performing the texture filtering by using the read texture data and the determined texture filtering mode.

17. A graphic processing apparatus comprising:
   a texture processor; and
   a computer-readable memory comprising programs that, when executed by the texture processor, perform operations comprising;
   receiving a transmission request for pixel values corresponding to pixels constituting a frame from a shade-core, wherein the shade-core performs pixel shading to determine colors of the pixels;
   acquiring texture position information in a texture image corresponding to pixel position information of the pixels;
   acquiring texture classification information (TCI) representing a similarity between respective texture factors of two or more classified regions in the texture image based on the texture position information;
   determining an amount of texture data requested from a memory according to the TCI, read texture data corresponding to the determined amount of texture data from the memory based on the texture position information; and
   generating the pixel values by using the read texture data.

18. The graphic processing apparatus of claim 17, wherein the determining of the amount of texture data comprises determining a minimum amount of texture data by using the TCI and a predetermined threshold value at which texture factor values in the texture image are determined to be similar.

19. The graphic processing apparatus of claim 17, wherein the texture position information comprises at least one of texture coordinate information and an address of a graphic processing unit (GPU) memory used to request the texture data.

20. The graphic processing apparatus of claim 17, wherein the programs that perform the operation comprises determining the pixel values corresponding to a tile.

21. The graphic processing apparatus of claim 20, wherein the programs that perform the operation comprises storing the pixel values corresponding to the tile.

* * * * *